US010719123B2

United States Patent
Song et al.

(10) Patent No.: US 10,719,123 B2
(45) Date of Patent: Jul. 21, 2020

(54) MULTIPARTY OBJECT RECOGNITION

(71) Applicant: Nant Holdings IP, LLC, Culver City, CA (US)

(72) Inventors: Bing Song, La Canada, CA (US); John Wiacek, Culver City, CA (US); David McKinnon, Culver City, CA (US); Matheen Siddiqui, Santa Clara, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 414 days.

(21) Appl. No.: 14/800,554

(22) Filed: Jul. 15, 2015

(65) Prior Publication Data

US 2016/0018886 A1    Jan. 21, 2016

Related U.S. Application Data

(60) Provisional application No. 62/024,825, filed on Jul. 15, 2014.

(51) Int. Cl.
```
G06F 3/01      (2006.01)
G06F 3/0488    (2013.01)
G06F 3/048     (2013.01)
H04L 29/06     (2006.01)
G06F 3/0484    (2013.01)
G06F 3/0481    (2013.01)
```
(Continued)

(52) U.S. Cl.
CPC ............ *G06F 3/011* (2013.01); *A63F 13/213* (2014.09); *A63F 13/215* (2014.09); *A63F 13/65* (2014.09); *G06F 3/017* (2013.01); *G06F 3/04815* (2013.01); *G06F 3/04845* (2013.01); *G06T 19/00* (2013.01); *H04L 65/403* (2013.01); *G06T 2219/024* (2013.01)

(58) Field of Classification Search
None
See application file for complete search history.

(56) References Cited

U.S. PATENT DOCUMENTS

| | | |
|---|---|---|
| 7,564,469 B2 | 7/2009 | Cohen |
| 8,332,424 B2 | 12/2012 | Flynn et al. |

(Continued)

FOREIGN PATENT DOCUMENTS

WO    WO 98/46323 A1    10/1998

*Primary Examiner* — Nhat Huy T Nguyen
(74) *Attorney, Agent, or Firm* — Mauriel Kapouytian Woods LLP; Liang Huang; Andrew Noble

(57) ABSTRACT

Multiparty object recognition systems and methods are disclosed. A method of interactively manipulating virtual object data, wherein an object database is configured to store first party object data that corresponds to a first real-world object and is further configured to store second party object data that corresponds to a second real-world object, includes obtaining the first party object data and the second party object data for storage within the object database. Access to the object database is controlled such that the first party object data and the second party object data is accessible to the first party and the second party. Modification of the first party object data by the second party is facilitated to generate modified first party object data that is in accordance with at least one context parameter of the second party object data, and the modified first party object data is communicated to the first party.

29 Claims, 9 Drawing Sheets

(51) Int. Cl.
  *A63F 13/65*  (2014.01)
  *A63F 13/213* (2014.01)
  *G06T 19/00*  (2011.01)
  *A63F 13/215* (2014.01)

(56) References Cited

U.S. PATENT DOCUMENTS

| | | | |
|---|---|---|---|
| 9,113,068 B1* | 8/2015 | Whitson | H04N 5/23206 |
| 2002/0049510 A1* | 4/2002 | Oda | B25J 9/1689 |
| | | | 700/114 |
| 2006/0223635 A1 | 10/2006 | Rosenberg | |
| 2007/0265089 A1 | 11/2007 | Robarts et al. | |
| 2008/0094417 A1 | 4/2008 | Cohen | |
| 2010/0017722 A1 | 1/2010 | Cohen | |
| 2012/0256954 A1 | 10/2012 | Soon-Shiong | |
| 2012/0306924 A1 | 12/2012 | Willoughby et al. | |
| 2013/0066878 A1 | 3/2013 | Flynn et al. | |
| 2013/0293468 A1* | 11/2013 | Perez | G06F 3/033 |
| | | | 345/158 |
| 2014/0033098 A1* | 1/2014 | Uota | G06F 3/0488 |
| | | | 715/765 |
| 2014/0168177 A1* | 6/2014 | Mkrtchyan | G06F 3/041 |
| | | | 345/179 |
| 2014/0354553 A1* | 12/2014 | Dai | G06F 3/0416 |
| | | | 345/173 |

* cited by examiner

500
Modification of First Party Object Data by Second Party

MULTIPARTY OBJECT RECOGNITION

CROSS REFERENCE TO RELATED APPLICATIONS

This application claims the benefit of U.S. Provisional Application No. 62/024,825, filed Jul. 15, 2014. The entire content of that application is hereby incorporated herein by reference.

TECHNICAL FIELD

The invention relates to virtual representation technologies, in particular as they relate to modification of virtual objects and object representation attributes.

BACKGROUND

The background description includes information that may be useful in understanding the present invention. It is not an admission that any of the information provided herein is prior art or relevant to the presently claimed invention, or that any publication specifically or implicitly referenced is prior art.

Recent improvements in processing power have led to the possibility of mainstream image recognition and object recognition applications. For example, gaming systems have been developed that incorporate elements of image recognition and object recognition to implement novel or simplified control systems, where, for example, a user's movements are captured, digitized, and used to control movements or other actions within a game. Despite considerable potential, however, such image recognition and object recognition technology has not seen widespread adoption.

SUMMARY

Various attempts have been made to incorporate elements of image recognition and object recognition systems in applications that allow for the manipulation of digital images (or other digital analogs) of real-world objects. One such attempt is disclosed in United States Patent Application No. 2012/0306924 to Willoughby et al., which describes the use of "skeletons" that are mapped onto both a user and an object to allow a user to control movements of a representation of the object via digitized images of the user. Another approach is described in U.S. Pat. No. 7,564,469 to Cohen, which discloses the use of an image captured by a mobile device to control a mixed reality display via a command set. In another approach, United States Patent Application No. 2012/0256954 to Soon-Shiong, describes an augmented reality system that modifies a scene that is presented to a user based on interactions between the represented objects.

While such approaches have utility within certain narrow contexts, they are too limited to be useful in many collaborative engineering and creative applications, where efforts to portray augmented reality, mixed reality or virtual reality interactions between real-world objects are frequently limited to previously prepared animations, the manipulation of physical models, and static whiteboard depictions. As such, there is still a need for systems, apparatuses and methods for interactively manipulating virtual object data in augmented reality, mixed reality or virtual reality environments, such as in real-time.

The inventive subject matter provides apparatuses, systems and methods in which data related to real-world objects can be manipulated in a cooperative manner by a plurality of users. Data related to a first real-world object and a second real-world object can be stored in a database that is accessible by two or more users via a portal engine. The portal engine permits a user to access and modify data related to a first object, and further supports presentation of the modified first object data and data related to a second object to a different user. The data related to the first object can be modified in the context of data related to the second object.

In an embodiment, interactively manipulating virtual object data, wherein an object database is configured to store first party object data, associated with a first party, that corresponds to a first real-world object and is further configured to store second party object data, associated with a second party, that corresponds to a second real-world object, includes obtaining the first party object data and the second party object data for storage within the object database. The first party object data and the second party object data may include at least one of digital image data, digital video data, digital audio data, digital text data, known virtual object data, biometric data, financial data, medical data, and transaction data. Access to the object database is controlled such that the first party object data and the second party object data is accessible to at least the first party and the second party. Modification of the first party object data by the second party is facilitated to generate modified first party object data, the modified first party object data being in accordance with at least one context parameter of the second party object data, and the modified first party object data is communicated to the first party. The at least one context parameter may correspond to at least one of a temporal context, a spatial context, a thematic context, an additive context, a subtractive context, and a geometric context of the second party object data. The modified first party object data may be usable for presentation within a collaborative user environment, and the modified first party object data may be communicated to the first party in real-time. The first party and the second party may include at least one of a person, a group of people, and an automated device.

In some embodiments, the modified first party object data may be communicated as one of machine-readable image data or raw data which is convertible at a receiving device.

In some embodiments, at least one of the first party object data and second party object data is analyzed, and analyzing at least one of the first party object data and second party object data may include matching features of the first party object data and the second party object data using at least one of an image recognition algorithm, a pattern recognition algorithm, a speech recognition algorithm, a user matching algorithm, and a location recognition algorithm.

In some embodiments, at least one of the first party object data and second party object data may comprise metadata. The metadata may comprise at least one of first party-specific data or second party-specific data, location data, time data, user identification data, annotation data, social media data, product data, security data, and contextual data.

In some embodiments, at least one of the first party object data and the second party object data may be obtained by using an image recognition algorithm on a digital representation of at least one of the first real-world object and the second real-world object.

In some embodiments, at least one of the first party object data and the second party object data may be obtained based on at least one of an identification of object data by a user, and an instruction from another device.

In some embodiments, the first real-world object may include at least one of a visible object, an audible object, a biometric object, a motion, and a gesture. The visible object may comprise at least one of a living object, a landmark, an architectural structure, a conveyance, a consumer product, a tool, a printed or displayed object, a toy, a musical instrument, an educational item, an art object, or a natural inanimate object. The audible object may comprise at least one of a voice, a sound of a musical instrument, a sound of a living object, a sound of an inanimate object, a sound of a vehicle, and an electronically generated audible signal.

In some embodiments, the first real-world object and second real-world object may comprise different aspects of a single real-world object.

In some embodiments, the first real-world object may comprise at least one property that triggers the modification of the first party object data, the at least one property comprising at least one of a chemical signature, temperature, pressure, electromagnetic field, radiofrequency, shape, color, texture, taste, smell, mechanical, biometric, or electrical property.

In some embodiments, the modification of the first party object data may comprise one or more of adding supplemental information, changing a spatial aspect of the first party object data, changing an attribute of the first party object data, combining the first party object data with the second party object data, creating or changing a relationship between the first party object data and the second party object data, and adding contextual data to the first party object data. In some embodiments, the modification of the first party object data may include at least one of filtering, moving, manipulating, combining, editing, annotating, or animating the first party object data.

In some embodiments, the modified first party object data may comprise at least one of the second party object data, and object data from a source other than the first party and the second party.

In some embodiments, the object database may be accessible to at least the first party and the second party via a user portal, and the user portal may comprise at least one of a mobile device, an appliance, a vehicle, a robot, a kiosk, a television, and a game console. A user interface, comprising at least one of a graphical user interface, a voice-controlled interface, and a motion-controlled interface, may be presented for access to the object database.

In some embodiments, access to the object database may be controlled such that the object database is accessible to a party other than the first party and second party. In some embodiments, access to the object database may be controlled based on at least one of a classification of a real-world object, a proximity metric, a subscription status, and an authorization.

In some embodiments, the modified first party object data may be stored within the object database, wherein the modified first object data may be further modifiable to generate nth-order modified first object data.

In some embodiments, the modified first party object data may be communicated to the second party.

Various objects, features, aspects and advantages of the inventive subject matter will become more apparent from the following detailed description of preferred embodiments, along with the accompanying drawing figures in which like numerals represent like components.

Figure 1:
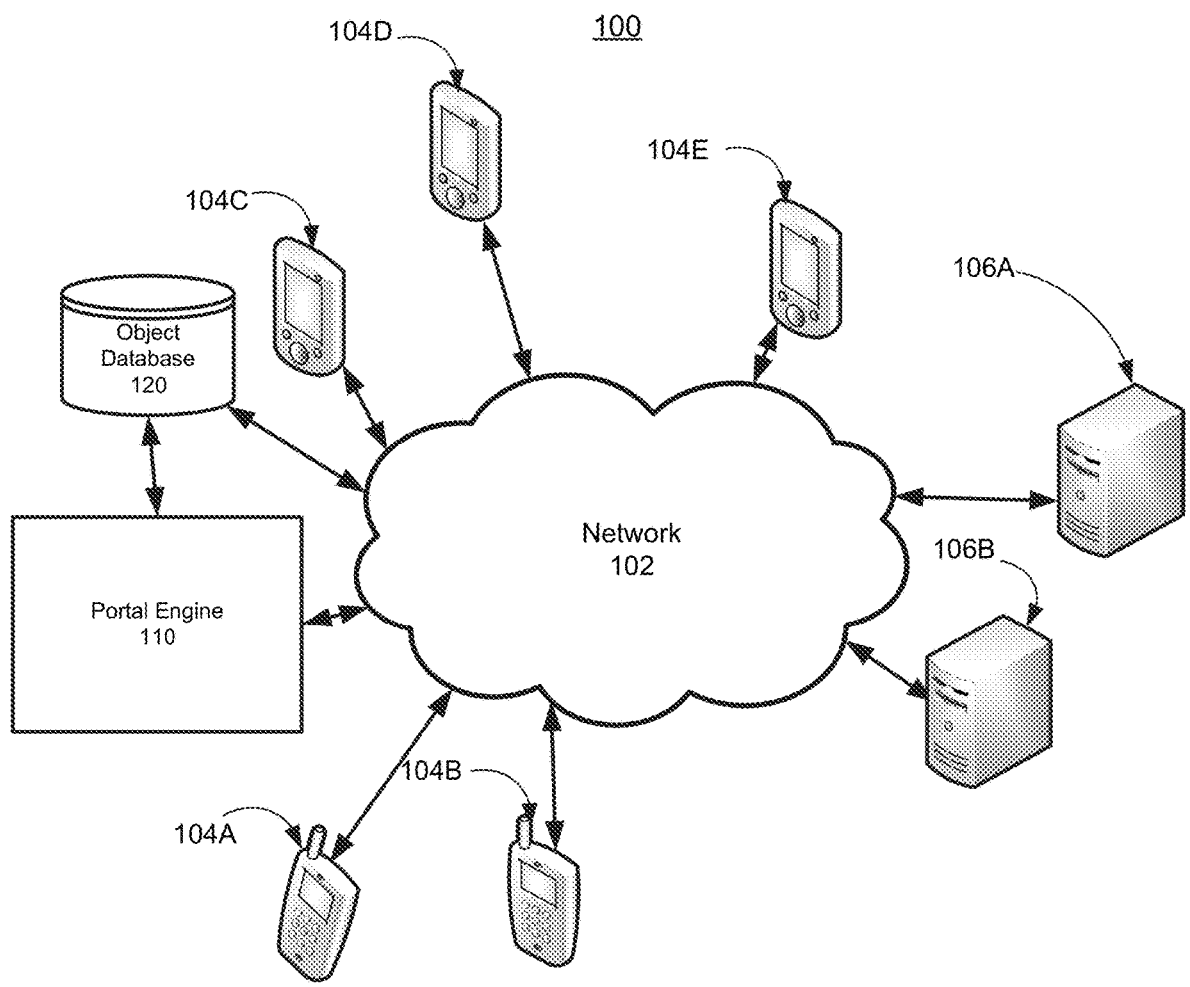
FIG. 1 illustrates an exemplary network environment that may be used for multiparty object recognition systems and methods in accordance with various embodiments.

While the invention is described with reference to the above drawings, the drawings are intended to be illustrative, and other embodiments are consistent with the spirit, and within the scope, of the invention.

DETAILED DESCRIPTION

The various embodiments now will be described more fully hereinafter with reference to the accompanying drawings, which form a part hereof, and which show, by way of illustration, specific examples of practicing the embodiments. This description may, however, be embodied in many different forms and should not be construed as being limited to the embodiments set forth herein; rather, these embodiments are provided so that this description will be thorough and complete, and will fully convey the scope of the invention to those skilled in the art. Among other things, this description may be embodied as methods or devices. Accordingly, any of the various embodiments herein may take the form of an entirely hardware embodiment, an entirely software embodiment or an embodiment combining software and hardware aspects. The following description is, therefore, not to be taken in a limiting sense.

Throughout the description and claims, the following terms take the meanings explicitly associated herein, unless the context clearly dictates otherwise:

The phrase "in one embodiment" as used herein does not necessarily refer to the same embodiment, though it may. Thus, as described below, various embodiments of the invention may be readily combined, without departing from the scope or spirit of the invention.

As used herein, the term "or" is an inclusive "or" operator, and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to"

and "coupled with" are also used to mean "communicatively coupled with", possibly via one or more intermediary devices.

In addition, throughout the description, the meaning of "a," "an," and "the" includes plural references, and the meaning of "in" includes "in" and "on."

The following discussion provides many example embodiments of the inventive subject matter. Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, engines, controllers, modules, or other types of computing device structures operating individually or collectively. One skilled in the art should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, such as the Internet, a LAN, WAN, VPN, or other type of packet-switched network, a circuit-switched network, cell-switched network; or other type of network.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the description as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the description should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the description herein is deemed to contain the group as modified, thus fulfilling the written description of all Markush groups used in the appended claims.

One should appreciate that the disclosed techniques provide many advantageous technical effects including facilitating and streamlining cooperative design and editing efforts. Thus, a computing device is configured to allow data related to real-world objects to be manipulated in a cooperative manner by two or more users. The computing device is able to process substantial amounts of digital data well beyond the capability of a human being.

A multiparty object recognition as described herein allows for the manipulation of virtual objects by multiple users. Methods and systems for a multiparty object recognition can be implemented in a variety of ways. FIG. 1 illustrates an exemplary network environment that may be used for multiparty object recognition systems and methods in accordance with various embodiments. In one exemplary embodiment, a multiparty object recognition system for interactively manipulating object data can be implemented within a networked computing environment 100 (e.g., a cloud-computing environment). Networked computing environment 100 comprises at least one network 102. In an exemplary embodiment, network 102 is the Internet. In other embodiments, network 102 may comprise one or more of a number of different types of networks, such as, for example, an intranet, a local area network (LAN), a wide area network (WAN), a wireless network, or other type of packet-switched network, circuit-switched network or cell-switched network. Other networks may be used. Alternatively, network 102 may comprise a combination of different types of networks.

Within the environment 100, one or more servers 106A-B and/or client devices 104A-E can implement a multiparty object recognition system. Examples of client devices 104A-E can include mobile devices (such as laptop computers, tablets, or smartphones), appliances, vehicles, robots, kiosks or other types of public terminals, televisions, digital media players, game consoles, or other types of computing devices. Further, a client device may be associated with a party (user) such that, for example, client devices 104A and 104B may be associated with a first party and a second party, respectively.

In an embodiment, one or more client devices 104A-E and/or servers 106A-B can host or be in communication with apparatuses, e.g., portal engine 110 and object database 120, to implement a multiparty object recognition system that is accessible to client devices 104A-E. For example, object database 120 may be configured to store first party object data, associated with a first party, that corresponds to a first real-world object and be further configured to store second party object data, associated with a second party, that corresponds to a second real-world object. Portal engine 110 may be configured to obtain the first party object data and the second party object data from any of client devices 104A-E and servers 106A-B for storage within object database 120. For example, portal engine 110 may be configured to obtain object data, including object data associated with a first party (i.e., first party object data) and a second party (i.e., second party object data), that corresponds to real-world objects depicted in a digital representation (e.g., a digital image or a video stream) using one or more image recognition algorithms, or based on identification instructions provided by a user or an external device.

Portal engine 110 may be further configured to control access to object database 120 such that the first party object data and the second party object data is accessible to the first party (e.g., at client device 104A) and the second party (e.g., at client device 104B), facilitate modification of the first party object data by the second party to generate modified first party object data that is in accordance with at least one context parameter of the second party object data, and communicate the modified first party object data to the first party, e.g., at client device 104A or another client device accessible by the first party.

As shown, object database 120 is communicatively coupled to portal engine 110. In an embodiment, portal engine 110 is configured to generate a user portal to object database 120 that may be accessible to multiple parties via client devices 104A-E. The user portal can be programmed or configured by the portal engine 110 to provide access to data stored in object database 120.

Alternatively, object database 120 and portal engine 110 can be remote from each other as well as from the one or more client devices 104A-E used to access object database 120, e.g., via the user portal. For example, one or more of object database 120 and portal engine 110 can be housed in one or more server computers 106A-B located remotely from client devices 104A-E. Likewise, the server(s) (or other computing device(s)) hosting portal engine 110 can be located remotely from server computers or other non-transitory computer-readable storage media hosting object database 120. In some embodiments, one or more of object database 120 and portal engine 110 can be integral to one or more of client devices 104A-E. For example, one of the client devices, e.g., client device 104A, may host portal engine 110 and/or object database 120, such that the other client devices 104B-E are clients to the host client device. In other embodiments, various functions described herein as being performed by portal engine 110 and object database 120 may be distributed between a plurality of client devices 104A-E, a plurality of servers 106A-B, or any combination of client devices and servers.

Figure 2:
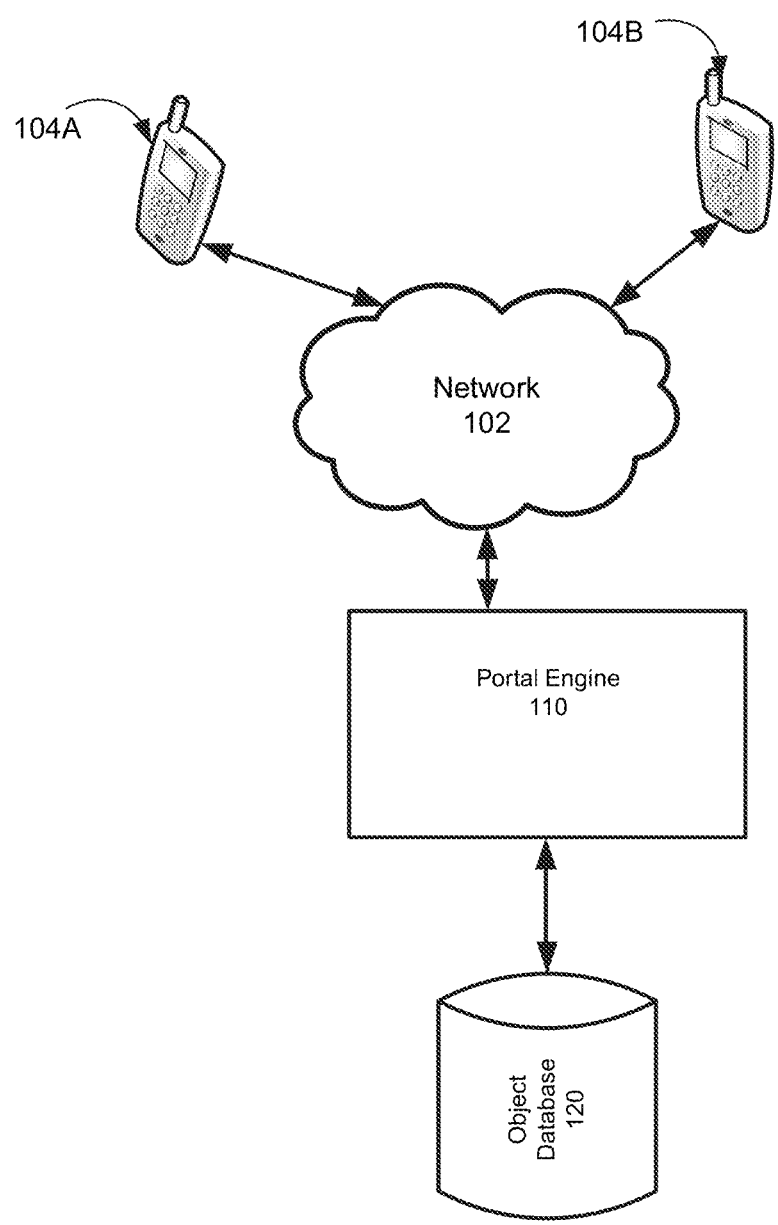
FIG. 2 illustrates apparatuses that may be used for multiparty object recognition in accordance with an embodiment.

FIG. 2 illustrates apparatuses that may be used for multiparty object recognition in accordance with an embodiment. In block diagram 200, elements for multiparty object recognition include portal engine 110, object database 120, and client devices 104A-B in communication with portal engine 110 via network 102. However, it should be noted that the elements in FIG. 2, and the various functions attributed to each of the elements, while exemplary, are described as such solely for the purpose of ease of understanding. One skilled in the art will appreciate that one or more of the functions ascribed to the various elements may be performed by any one of the other elements, and/or by an element (not shown) configured to perform a combination of the various functions.

In an embodiment, interactively manipulating virtual object data, wherein object database 120 is configured to store first party object data, associated with a first party, that corresponds to a first real-world object and is further configured to store second party object data, associated with a second party, that corresponds to a second real-world object, includes portal engine 110 being configured to obtain the first party object data and the second party object data for storage within object database 120. The first party object data and the second party object data may include at least one of digital image data, digital video data, digital audio data, digital text data, known virtual object data, biometric data, financial data, medical data, and transaction data. In some embodiments, the first party object data and second party object data may comprise metadata. The metadata may comprise at least one of first party-specific data or second-party-specific object data, location data, time data, user identification data, annotation data, social media data, product data, security data, and contextual data.

In some embodiments, portal engine 110 may be configured to obtain at least one of the first party object data and the second party object data by using an image recognition algorithm on a digital representation of at least one of the first real-world object and the second real-world object. In some embodiments, the feature detection algorithm may include at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithm. Portal engine 110 also may be configured to obtain at least one of the first party object data and the second party object data based on at least one of an identification of object data by a user, and an instruction from another device.

In some embodiments, the first real-world object and second real-world object may include at least one of a visible object, an audible object, a biometric object, a motion, and a gesture. For example, the visible object may comprise at least one of a living object, a landmark, an architectural structure, a conveyance, a consumer product, a tool, a printed or displayed object, a toy, a musical instrument, an educational item, an art object, or a natural inanimate object, and the audible object may comprise, e.g., at least one of a voice, a sound of a musical instrument, a sound of a living object, a sound of an inanimate object, a sound of a vehicle, and an electronically generated audible signal. In some embodiments, the first real-world object and second real-world object may comprise different aspects of a single real-world object. For example, the first real-world object may be one side of a real-world object and the second real-world object may be another side of the real-world object.

Portal engine 110 is further configured to control access to object database 120 such that the first party object data and the second party object data is accessible to at least the first party and the second party, e.g., via client devices 104A and 104B, respectively. The first party and the second party may include at least one of a person, a group of people, and an automated device.

Portal engine 110 is further configured to facilitate modification of the first party object data by the second party (e.g., via client device 104B) to generate modified first party object data, the modified first party object data being in accordance with at least one context parameter of the second party object data. The at least one context parameter may correspond to at least one of a temporal context, a spatial context, a thematic context, an additive context, a subtractive context, and a geometric context of the second party object data.

In some embodiments, the first real-world object may comprise at least one property that triggers the modification of the first party object data, the at least one property comprising at least one of a chemical signature, temperature, pressure, electromagnetic field, radiofrequency, shape, color, texture, taste, smell, mechanical, biometric, or electrical property.

In some embodiments, the modification of the first party object data may comprise one or more of adding supplemental information, changing a spatial aspect of the first party object data, changing an attribute of the first party object data, combining the first party object data with the second party object data, creating or changing a relationship between the first party object data and the second party object data, and adding contextual data to the first party object data. In some embodiments, the modification of the first party object data may include at least one of filtering, moving, manipulating, combining, editing, annotating, or animating the first party object data.

In some embodiments, the modified first party object data may comprise at least one of the second party object data, and object data from a source other than the first party and the second party.

Portal engine 110 is further configured to communicate the modified first party object data to the first party. The modified first party object data may be usable for presentation within a collaborative user environment, and the modified first party object data may be communicated to the first party in real-time. In some embodiments, the modified first party object data may be communicated as one of machine-readable image data or raw data which is convertible at a receiving device. In some embodiments, the modified first party object data also may be communicated to the second party.

In some embodiments, portal engine 110 is further configured to analyze at least one of the first party object data and second party object data. For example, portal engine 110 may be configured to analyze at least one of the first party object data and second party object data by matching features of the first party object data and the second party object data using at least one of an image recognition algorithm, a pattern recognition algorithm, a speech recognition algorithm, a user matching algorithm, and a location recognition algorithm.

In some embodiments, portal engine 110 may be further configured to provide at least the first party and the second party access to the object database via a user portal. For example, the user portal may comprise at least one of a mobile device (e.g., client devices 104A-B), an appliance, a vehicle, a robot, a kiosk, a television, and a game console. In some embodiments, portal engine 110 may be configured to present a user interface, comprising at least one of a graphical user interface, a voice-controlled interface, and a motion-controlled interface, to the first party and the second party for access to the object database. For example, the user portal and/or user interface may comprise a content source control system (e.g., such as GitHub, the Concurrent Versions System (CVS), etc.), so that the content from the first party and the second party can be synchronized once it is published, e.g., by portal engine 110.

In some embodiments, portal engine 110 may be further configured to control access to object database 120 such that the object database is accessible to a party other than the first party and second party. In some embodiments, access to object database 120 may be controlled based on at least one of a classification of a real-world object, a proximity metric, a subscription status, and an authorization.

In some embodiments, portal engine 110 may be further configured to store the modified first party object data within object database 120, wherein the modified first object data may be further modifiable to generate nth-order modified first object data.

Figure 3:
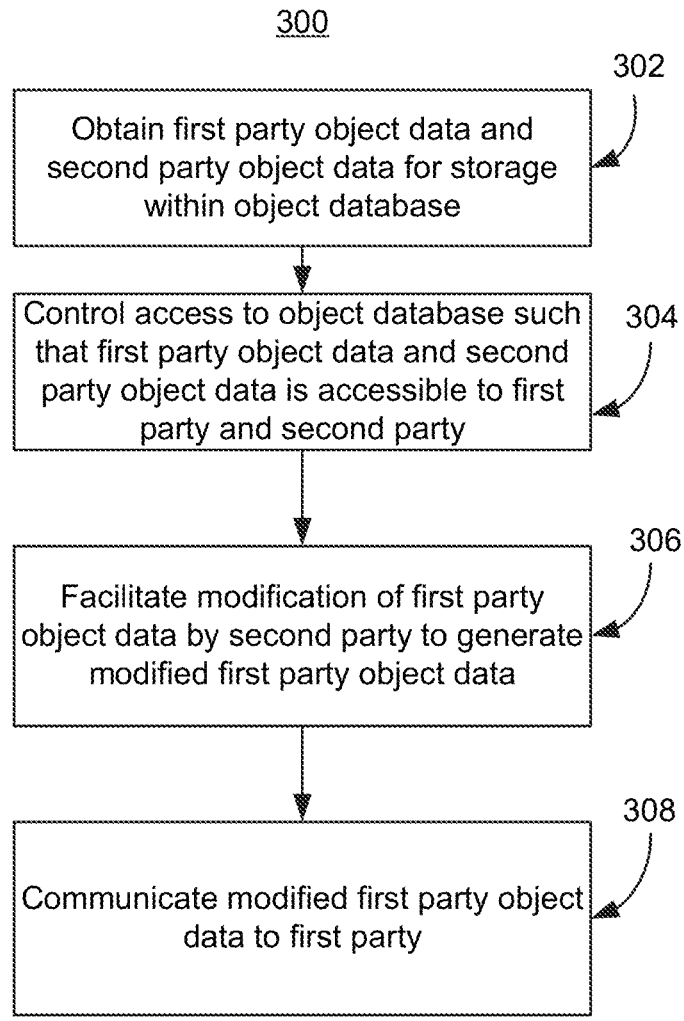
FIG. 3 illustrates a flow diagram of example operations for multiparty object recognition in accordance with an embodiment.
Figure 4A:
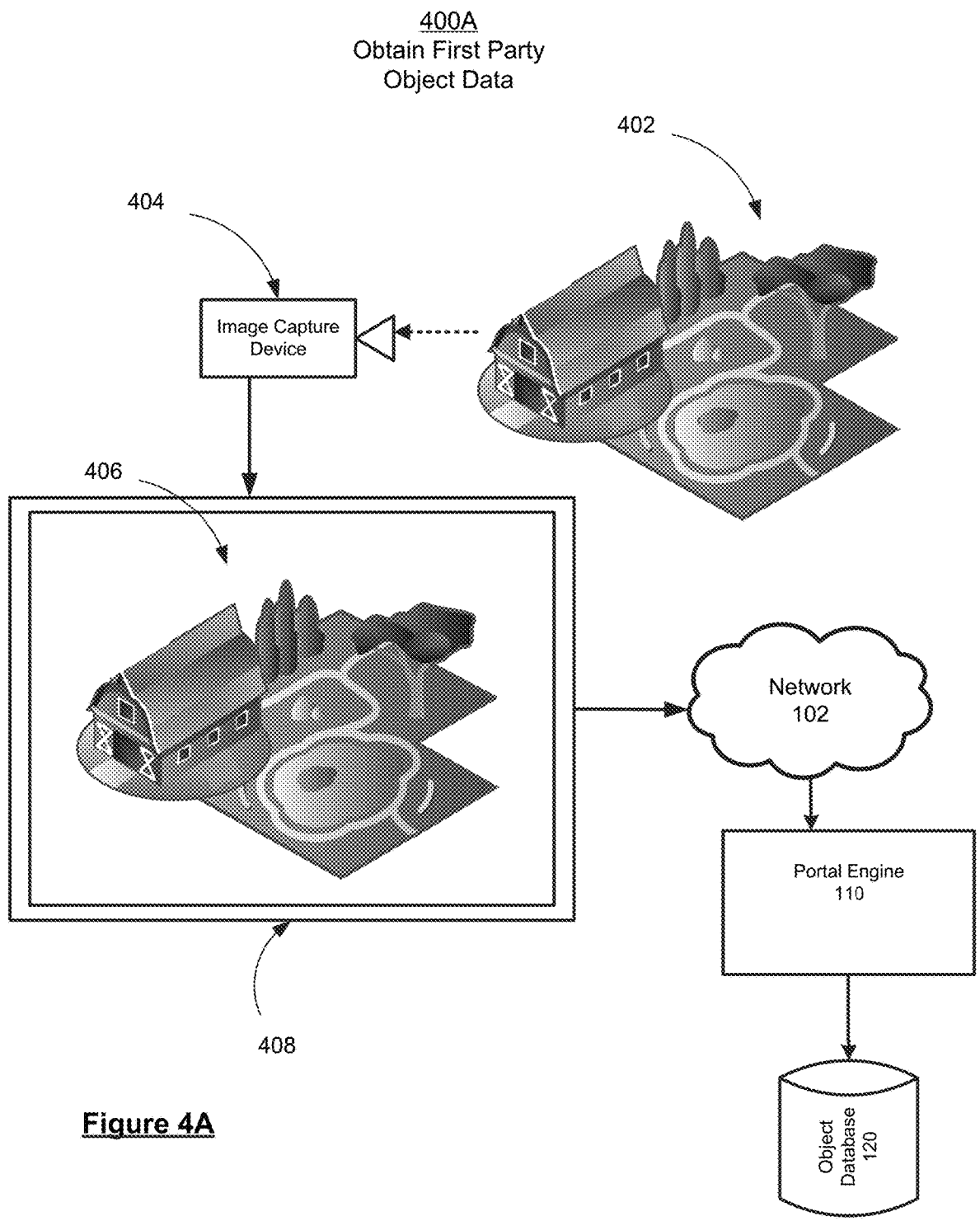
FIG. 4A illustrates obtaining first party object data in accordance with an embodiment.
Figure 5:
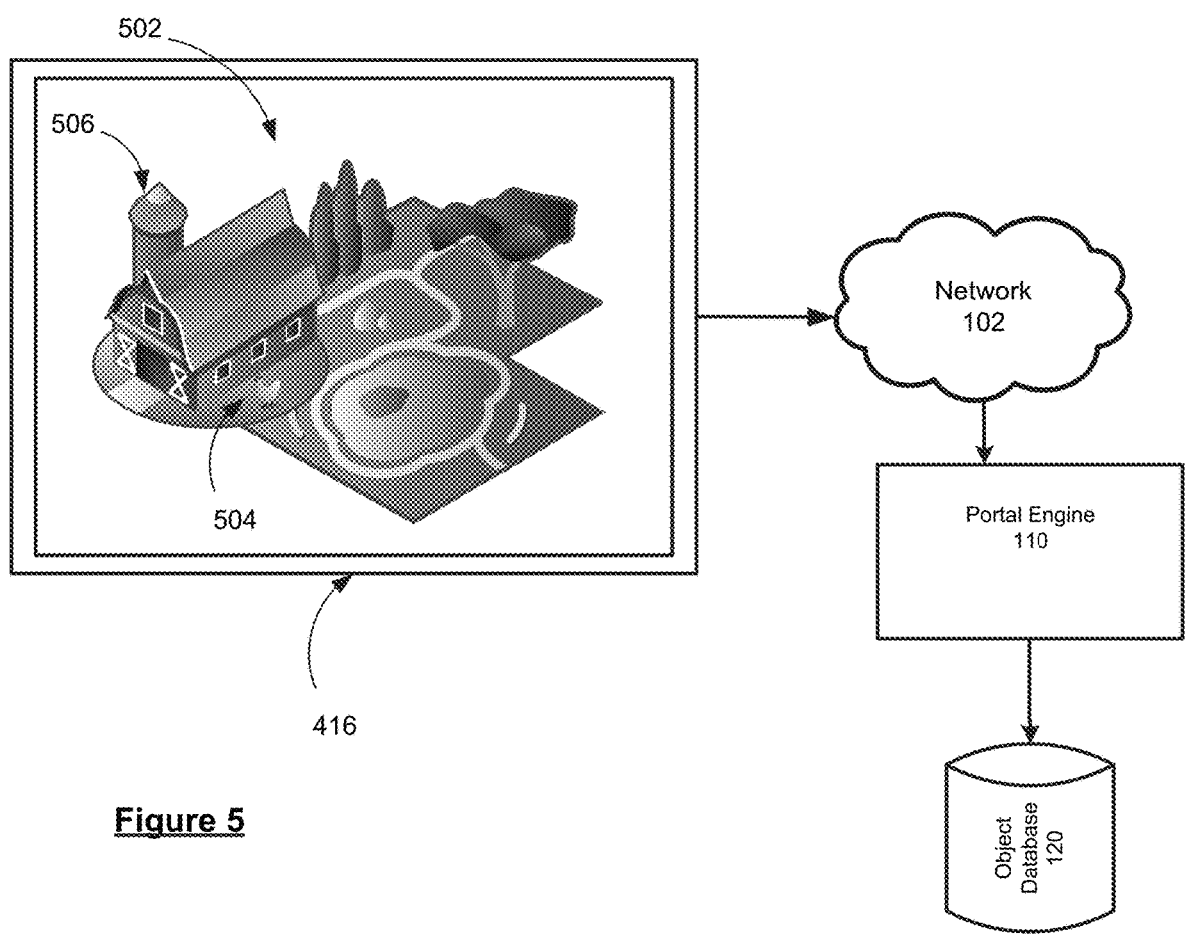
FIG. 5 illustrates modification of the first party object data by the second party in accordance with an embodiment.
Figure 6:
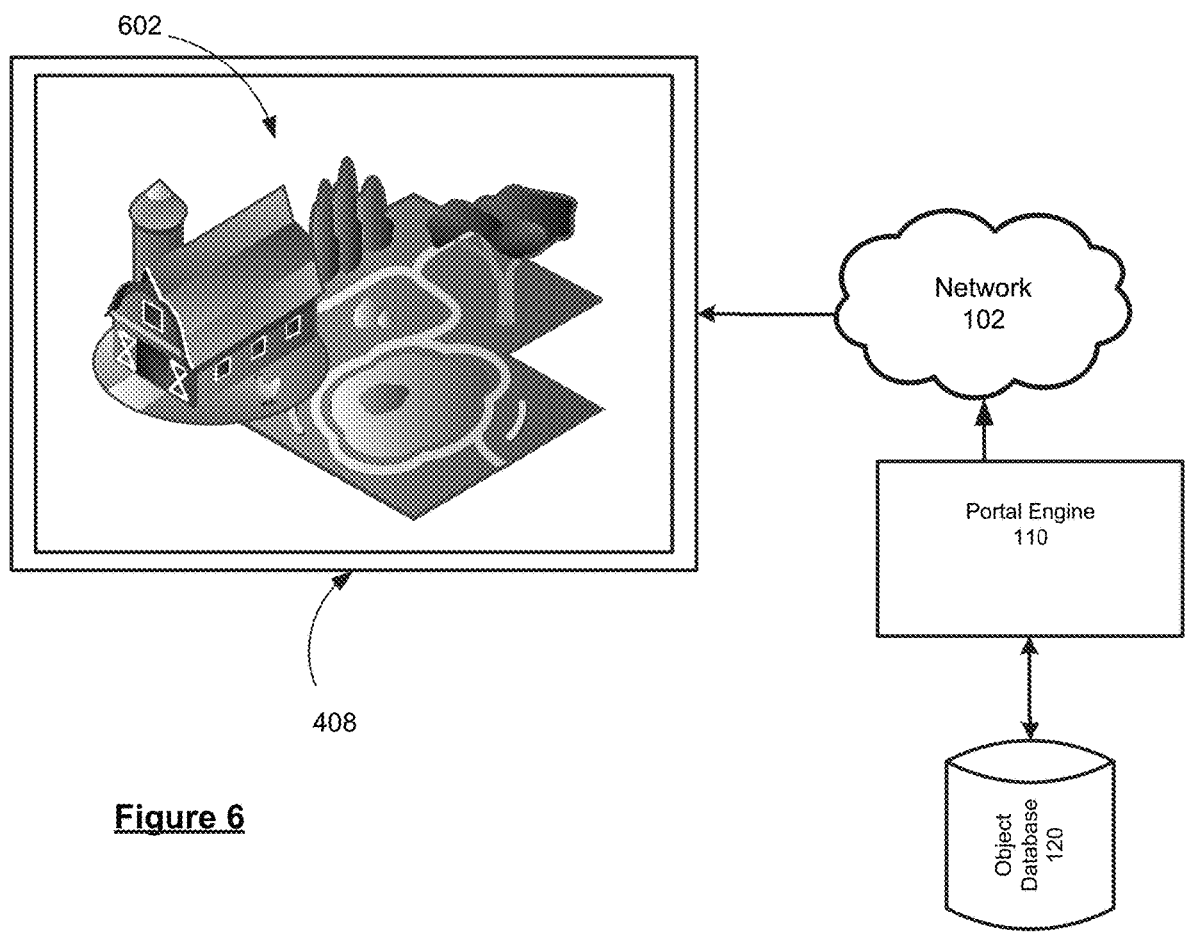
FIG. 6 illustrates communicating the modified first party object data to the first party in accordance with an embodiment.

FIG. 3 illustrates a flow diagram of example operations for multiparty object recognition in accordance with an embodiment. FIG. 3 presents an overview of a multiparty object recognition method 300 executed by a portal engine (e.g., computer server, computer client, tablet, gaming console, etc.), such as portal engine 110 in FIG. 2. FIGS. 4-6 below present additional details regarding the various steps of method 300, and are referenced seriatim with corresponding steps of method 300.

At step 302, interactively manipulating virtual object data, wherein an object database is configured to store first party object data, associated with a first party, that corresponds to a first real-world object and is further configured to store second party object data, associated with a second party, that corresponds to a second real-world object, includes obtaining the first party object data and the second party object data for storage within the object database. FIG. 4A illustrates obtaining first party object data in accordance with an embodiment. In block diagram 400A, an image of first real-world object 402 is captured by image capture device 404 and presented as digital representation 406 (e.g., a digital image) within user interface 408. For example, a client device, such as client device 104A, may comprise image capture device 404 (e.g., a digital camera or video camera) and user interface 408 (e.g., a visual display).

First real-world object 402 may include at least one of a visible object, an audible object, a biometric object, a motion, and a gesture. For example, a visible real-world object may comprise at least one of a living object, a landmark, an architectural structure, a conveyance, a consumer product, a tool, a printed or displayed object, a toy, a musical instrument, an educational item, an art object, or a natural inanimate object. An audible real-world object may comprise, e.g., at least one of a voice, a sound of a musical instrument, a sound of a living object, a sound of an inanimate object, a sound of a vehicle, and an electronically generated audible signal.

In an embodiment, portal engine 110 is configured to receive digital representation 406 and obtain first party object data by using an image recognition algorithm on digital representation 406. For example, the image recognition algorithm may be a feature detection algorithm including at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithm. Alternatively, portal engine 110 may be configured to obtain the first party object data based on at least one of an identification of object data by a user (e.g., the first party), and an instruction from another device. In an embodiment, the first party object data may include at least one of digital image data, digital video data, digital audio data, digital text data, known virtual object data, biometric data, financial data, medical data, and transaction data. In some embodiments, the first party object data may comprise metadata. The metadata may comprise at least one of first party-specific data, location data, time data, user identification data, annotation data, social media data, product data, security data, and contextual data.

Portal engine 110 is then configured to store the first party object data in object database 120.

Figure 4B:
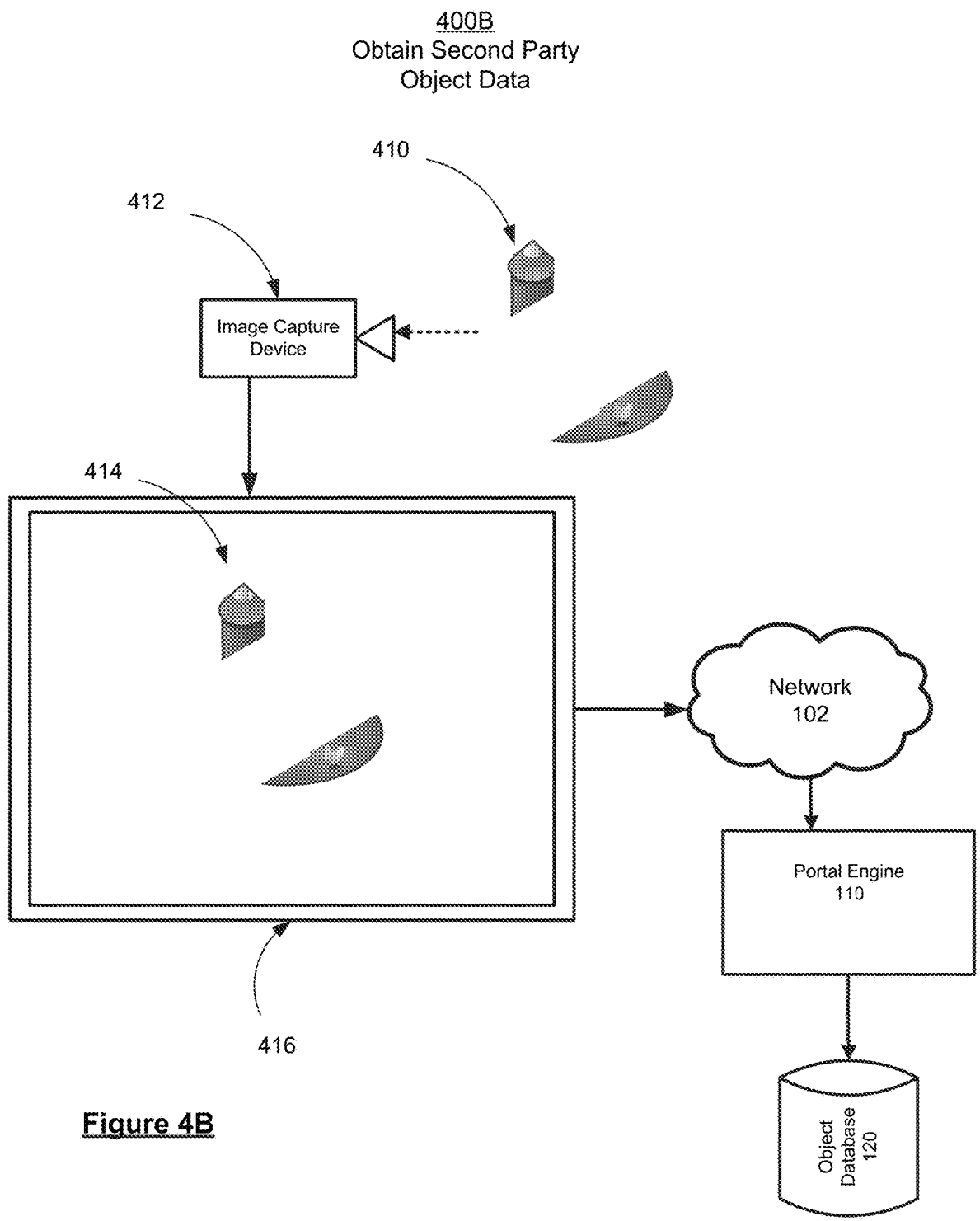
FIG. 4B illustrates obtaining second party object data in accordance with an embodiment.

FIG. 4B illustrates obtaining second party object data in accordance with an embodiment. Similar to block diagram 400A above, in block diagram 400B an image of second real-world object 410 is captured by image capture device 412 and presented as digital representation 414 (e.g., a digital image) within user interface 416. For example, a client device associated with a second user, such as client device 104B, may comprise image capture device 412 (e.g., a digital camera or video camera) and user interface 416 (e.g., a visual display).

Second real-world object 410 may include at least one of a visible object, an audible object, a biometric object, a motion, and a gesture. For example, a visible real-world object may comprise at least one of a living object, a landmark, an architectural structure, a conveyance, a consumer product, a tool, a printed or displayed object, a toy, a musical instrument, an educational item, an art object, or a natural inanimate object. An audible real-world object may comprise, e.g., at least one of a voice, a sound of a musical instrument, a sound of a living object, a sound of an inanimate object, a sound of a vehicle, and an electronically generated audible signal.

In an embodiment, portal engine 110 is configured to receive digital representation 414 and obtain second party object data by using an image recognition algorithm on digital representation 414. For example, the image recognition algorithm may be a feature detection algorithm including at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithm. Alternatively, portal engine 110 may be configured to obtain the second party object data based on at least one of an identification of object data by a user (e.g., the second party), and an instruction from another device. In an embodiment, the second party object data may include at least one of digital image data, digital video data, digital audio data, digital text data, known virtual object data, biometric data, financial data, medical data, and transaction data. In some embodiments, the second party object data may comprise metadata. The metadata may comprise at least one of second party-specific data, location data, time data, user identification data, annotation data, social media data, product data, security data, and contextual data.

Portal engine 110 is then configured to store the second party object data in object database 120. In some embodiments, the first real-world object and second real-world object may comprise different aspects of a single real-world object. For example, the first real-world object may be one side of a real-world object and the second real-world object may be another side of the real-world object.

At step 304, access to object database 120 is controlled such that the first party object data and the second party object data is accessible to at least the first party and the second party, e.g., via client devices 104A and 104B, respectively. The first party and the second party may include at least one of a person, a group of people, and an automated device.

At step 306, modification of the first party object data by the second party (e.g., via client device 104B) is facilitated to generate modified first party object data, the modified first party object data being in accordance with at least one context parameter of the second party object data. FIG. 5 illustrates modification of the first party object data by the second party in accordance with an embodiment. In block diagram 500, once access is granted to object database 120 the second party may modify the first party object data (e.g., via user interface 416) in accordance with a context parameter of the second party object data (e.g., modifications 504 and 506), thereby generating modified first party object data. The second party can modify the first party object data in any suitable fashion. For example, the modification of the first party object data may comprise one or more of adding supplemental information, changing a spatial aspect of the first party object data, changing an attribute of the first party object data, combining the first party object data with the second party object data (e.g., as shown by modifications 405 and 506), creating or changing a relationship between the first party object data and the second party object data, and adding contextual data to the first party object data. In some embodiments, the modification of the first party object data may include at least one of filtering, moving, manipulating, combining, editing, annotating, or animating the first party object data. Such modified first party object data can include second party object data. For example, data representing the first real-world object 402 supplied by the first party can be modified in accordance with a context parameter of data representing the second real-world object 410 supplied by the second party such that, when displayed, a representation of the first real-world object 402 can appear to be manipulated or otherwise modified by a representation of the second real-world object 410, as shown in representation 502. Alternatively, modified first party object data can include object data from a source other than the first party and/or second party, for example object data from a third party. The at least one context parameter may correspond to at least one of a temporal context, a spatial context, a thematic context, an additive context, a subtractive context, a geometric context of the second party object data, or a combination of context parameters.

In some embodiments, the first real-world object may comprise at least one property that triggers the modification of the first party object data, the at least one property comprising at least one of a chemical signature, temperature, pressure, electromagnetic field, radiofrequency, shape, color, texture, taste, smell, mechanical, biometric, or electrical property.

At step 308, the modified first party object data is communicated to the first party. FIG. 6 illustrates communicating the modified first party object data to the first party in accordance with an embodiment. In block diagram 600, portal engine 110 can be configured to retrieve the modified first party object data (e.g., from local memory and/or object database 120) and communicate the modified first party object data (e.g., via network 102 using an output module) for presentation 602 to the first party, such as at user interface 408. In some embodiments, the modified first party object data also may be communicated to the second party, e.g., for presentation at client device 104B. As such, the modified first party object data may be usable for presentation within a collaborative user environment (e.g., for presentation at user interface 408 and user interface 416), and the modified first party object data may be communicated at least to the first party in real-time. In some embodiments, the modified first party object data may be communicated as one of machine-readable image data or raw data which is convertible at a receiving device, e.g., client device 104A. In various embodiments, the first party can also modify the second party object data in a similar fashion, thereby generating modified second party object data in the context of first party object data. For example, portal engine 110 can permit the first user to access object database 120 and modify first party object data in the context of second party object data in order to generate modified first party object data. Such modifications to the first party object data and/or the second party object data can be made prior to (long-term) storage of the unmodified first party object data and/or second party object data. It should be appreciated that in some embodiments modified first party object data and modified second party object data can be further modified repeatedly in an iterative process.

Therefore, portal engine 110 is configured to facilitate modification, by a user, of object data provided by a different user. For example, utilizing a user portal, a second party User B can modify object data that was supplied by a first party User A (i.e. first party object data) to produce modified first party object data. Subsequently, portal engine 110 can present this modified first party object data to User A and/or User B, along with second party object data associated with User B. In some embodiments, the portal engine and/or the object database can be used to store such modified first party object data. Modifications of the first party object data can include the addition of supplemental information, changing one or more spatial aspects of first party object data, changing an attribute of a first party object data, combining first party object data with second party object data, creating a relationship between the first party object data and second party object data, changing a relationship between the first party object data and second party object data, and adding contextual data to the first party object data.

Towards this end, a real-world object from which first party object data, second party object data, or both first party object data and second party object data is derived can include one or more properties that trigger or are amenable to modification. For example, such properties can include a chemical signature, a temperature, a pressure, an electromagnetic field, a polarity, a static charge, a radiofrequency, a shape or configuration, a color, a texture, a taste, a smell, a mechanical property, a biometric property, and/or an electrical property. In some embodiments, a real-world object can include a number of parts. For example, each part may exhibit one or more of such modifiable properties, and can be modified independently. In other embodiments, modification of data related to one property can trigger an automated modification of data related to a different property. For example, modification of data related to shape or configuration of a real-world object by a user can trigger an automated change in data related to a mechanical property that reflects a result of the user-directed change.

Further, object database 120 is configured to store data related to real-world objects and/or modified data related to real-world objects. Such a database can be supported by any computing device that supports data storage (such as a mainframe, server, desktop computer, and/or laptop computer), and may be located remotely from other system components. In some embodiments, object database 120 can be composed of two or more secondary databases that are in communication with each other. Such secondary databases can reside in multiple and/or separate computing devices. The object database 120 is in communication with portal engine 110, which can provide access to object database 120 for two or more users. In some embodiments that utilize two or more secondary object databases, the secondary object databases can be in communication with each other and/or with portal engine 110. Portal engine 110 may be located at a distance from object database 120, and communication between object database 120 and portal engine 110 can be through a wired connection, a wireless connection, or via an intermediary data system such as a data cloud or cloud storage. In some embodiments, portal engine 110 can be located in a portable device, such as a laptop computer, tablet, and/or smart phone. At least two (and in some embodiments, three or more) parties, may be provided access to object database 120 by portal engine 110.

The various embodiments allow interactive manipulation of a virtual object using a common or shared platform. First party object data, which corresponds to a first real world object and is obtained from a first user or party, and second party object data, which corresponds to a second real world object and is obtained from a second user or party, is stored in an object database. The first party and second party (and in some embodiments, additional users) are provided with access to object database 120 via portal engine 110. Such a portal engine can be located in or on a user device that is remote or distal to the object database. Examples of user devices include a desktop computer, a laptop computer, a tablet, and/or a smart phone. In some embodiments, access to object database 120 can be controlled by physical access to a terminal or similar controller, a password, biometric data, possession of a hardware and/or software key, the class or other characteristic of the real world object, a proximity metric (ex: a location), a subscription status, and/or an authorization. To facilitate communication and usability, a portal engine can include a user interface. Suitable user interfaces include a graphical user interface, a voice-controlled interface, and/or a motion controlled interface.

In the various embodiments, modified first party object data can be further modified to form secondary, tertiary, and nth-order modified first party object data. Such a series of data modifications can be displayed, for example, in an order that creates an illusion of movement or a passage of time.

In some embodiments, portal engine 110 can be configured to perform an analysis on the first party object data, the second party object data, and/or both the first party object data and the second party object data. For example, portal engine 110 can match features of the first party object data and the second party object data. Alternatively, the portal engine can utilize time coding, image recognition, pattern recognition, speech recognition, user matching, user relationship, and or location or geographic recognition in the analysis of object data.

In some embodiments, some or all of the information provided by the user devices to the portal engine and/or other user devices can be provided more than once. For example, location data of the user devices can be provided to the portal engine and/or each other multiple times (e.g., continuously, repeatedly according to a desired frequency), and as such the object data contributed by/corresponding to each user device can be updated to account for this changed location. Likewise, information about a particular scene as determined by each user device can be shared frequently between the user devices themselves as well as the portal engine such that the portal engine and the other devices can receive updated regarding changes in a scene.

As the object data in the object database is updated by a corresponding user device, the updated version of the object data is shared with other user devices in the virtual space. For example, a first user device can transmit video data about a physical structure, whereby the virtual version of the structure can begin with only the initial view of the structure as provided by the first user device, and whereby the virtual version of the structure is updated as the user continues to transmit video data showing different parts of the structure. Other users, then can use their own object data (e.g., annotations for or about a structure that is being worked on, their own virtual tools; etc.) on the virtual structure as it becomes more developed. In some embodiments, any modifications to object data by other users in the collaborative environment can be updated, removed, deleted, modified, or otherwise changed based on updated versions of the source object data.

In a further aspect, the updating of object data by the source device or other user devices can be used in a dynamic recognition system. As object data is updated over time with more information, the object data becomes a more "fleshed out" representation of the real-world object. As the object data becomes more "fleshed out", the recognition of the real-world object and its properties can be updated to recognize new or different aspects of the real-world object, to further refine the recognized real-world object (such as from a general recognition of a car in an image as a generic 'car' to increasingly specific recognitions of 'sedan' to 'sedan of certain make and model' to 'sedan of certain make and model of a particular year').

In situations where multiple users are working in a collaborative environment, it is possible that their contributions can be duplicitous, redundant, or overlapping. In such cases, portal engine 110 can be configured to resolve redundancies in provided information, such as redundancies in data objects or redundancies in interactions with or modifications to data objects, such that a synchronized, synthesized version of the object data is shared among all participants.

As the object data representing real-world objects, scenes, etc., are updated over time by one or more user devices and collaborations, the physical aspects of the real-world objects, scenes, etc., (e.g., rigidity, static/dynamic properties, opacity, specularity, etc.) can be retained in object database 120. Changes to the object data within the portal engine, such as by other users interacting with the object data in a collaborative environment, can also be tracked as they affect the physical aspects represented by the virtual version of the real-world object. The portal engine can track the changes and resolve the physical changes over time.

Figure 7:
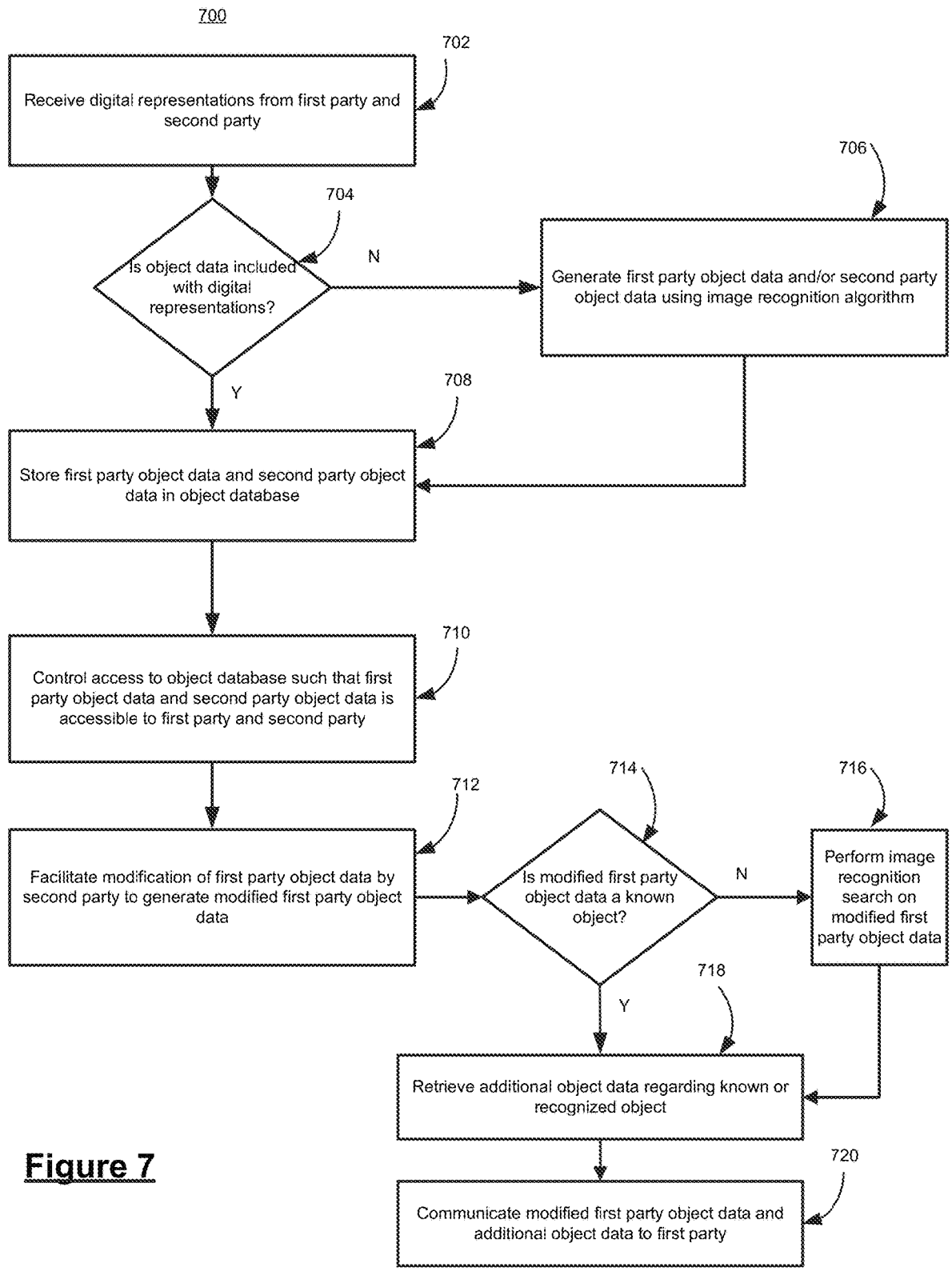
FIG. 7 illustrates a flow diagram of example operations for multiparty object recognition in accordance with an embodiment.

FIG. 7 illustrates a flow diagram of example operations for multiparty object recognition in accordance with an embodiment. FIG. 7 presents an overview of a multiparty object recognition method 700 executed by a portal engine (e.g., computer server, computer client, tablet, gaming console, etc.), such as portal engine 110 in FIG. 2.

At step 702, multiparty object recognition includes receiving digital representations from a first party and a second party. For example, portal engine 110 may receive one or more digital representations of a first real-world object (e.g., as captured by the first party using an image capture device, as illustrated in FIG. 4A) and one or more digital representations of a second real-world object (e.g., as captured by the second party using an image capture device, as illustrated in FIG. 4B).

At step 704, if object data is included with the digital representations received from the first party and the second party, the first party object data and second party object data may be stored (e.g., in object database 120) at step 708. If object data is not included with the digital representations received from either the first party or the second party, first party object data and/or second party object data may be generated using an image recognition algorithm at step 706. For example, the image recognition algorithm may be a feature detection algorithm including at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithm. Alternatively, the first party object data and second party object data may be obtained based on at least one of an identification of object data by a user (e.g., the first party), and an instruction from another device. The generated or obtained first party object data and/or second party object data may then be stored (e.g., in object database 120) at step 708.

At step 710, access to object database 120 is controlled such that the first party object data and the second party object data is accessible to at least the first party and the second party, e.g., via client devices 104A and 104B, respectively. The first party and the second party may include at least one of a person, a group of people, and an automated device.

At step 712, modification of the first party object data by the second party (e.g., via client device 104B) is facilitated to generate modified first party object data, the modified first party object data being in accordance with at least one context parameter of the second party object data. For example, modifications of the first party object data can include the addition of supplemental information, changing one or more spatial aspects of first party object data, changing an attribute of a first party object data, combining first party object data with second party object data, creating a relationship between the first party object data and second party object data, changing a relationship between the first party object data and second party object data, and adding contextual data to the first party object data.

At step 714, if the modified first party object data is identified as a known object, additional object data associated with the known object is retrieved at step 718, e.g., from object database 120 and/or from a third-party source. If the modified first party object data is not identified as a known object, an image recognition search is performed on the modified first party object data at step 716. For example, the image recognition search may be performed using an image recognition algorithm, wherein the modified first party object data is used as a query image that is matched to one or more document images of known objects. Once a match is found, additional object data associated with the identified known object may be retrieved at step 718. In some embodiments, as object data is updated over time with more information, the recognition of the real-world object matching the modified first party object data can be updated to recognize new or different aspects of the real-world object, and to further refine the recognized real-world object (such as from a general recognition of a car in an image as a generic 'car' to increasingly specific recognitions of 'sedan' to 'sedan of certain make and model' to 'sedan of certain make and model of a particular year'). As above, the image recognition algorithm used for the image recognition search may be a feature detection algorithm including at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithm.

At step 720, the modified first party object data and the additional object data is communicated to the first party. For example, portal engine 110 can be configured to retrieve the modified first party object data (e.g., from local memory and/or object database 120) and communicate the modified first party object data (e.g., via network 102 using an output module) for presentation to the first party, as shown in FIG. 6. In some embodiments, the modified first party object data also may be communicated to the second party. As such, the modified first party object data may be usable for presentation within a real-time collaborative user environment. In various embodiments, the first party can also modify the second party object data in a similar fashion, thereby generating modified second party object data in the context of first party object data. For example, portal engine 110 can permit the first user to access object database 120 and modify first party object data in the context of second party object data in order to generate modified first party object data. Such modifications to the first party object data and/or the second party object data can be made prior to (long-term) storage of the unmodified first party object data and/or second party object data. It should be appreciated that in some embodiments modified first party object data and modified second party object data can be further modified repeatedly in an iterative process.

In one illustrative example, portal engine 110 may be a 3-D graphical game engine. Based on the recognition of a particular scene, including the physical attributes of a scene and the real-world objects within a scene, the 3-D graphical game engine can incorporate virtual visual elements in an augmented reality display of a user's device. The recognized physical attributes of the scene can be used to construct interaction rules with virtual elements of the augmented reality environment. For example, the augmented reality functions can be associated with gameplay, whereby the virtual elements of the game (e.g., characters, menus, goals, interactions with other game elements, game rules) can be generated based on the scene in which the user device is located, and the physical attributes thereof. In further embodiments, two devices in a same general location can both contribute to the generation of the game elements based on their individual perceptions of the scene and real-world objects within the scene. User devices in separate locations can also collaborate in game play, whereby users in environments providing different scenes with different physical attributes can generate different virtual game content for the augmented reality gameplay. For example, if a first player is in a hot-weather environment and a second player is in a cold-weather environment, the augmented reality content generated by the hot-weather scene can include heat-based weapons which would be common in a hot-weather environment, but with limited effectiveness against hot-weather enemies. By collaborating with the cold-weather player, the cold-weather player can add cold-weather attributes to the hot-weather player's weapon, making the weapon more effective against the hot-weather enemies.

The following is an illustrative example of a use case involving functions and processes associated with the inventive subject matter. Consider a first user, Roy, whose car suddenly starts making strange noises while he is driving. Roy calls a second user, his friend Frank, who is a car enthusiast with experience working with cars and engines, for help with the problem. Frank wants to help Roy out, and they plan for Frank to gather his tools from his garage, and go to Roy's house. However, before Frank goes through the trouble of gathering all of his tools and driving across town, they both want to know whether they'll have the necessary tools to do the job, as well as the necessary parts for any necessary repairs.

Roy uses the camera on his cellular phone to take a picture of the engine of his car. Roy can access a portal engine that provides access to a virtual garage, and provide the image data from his cellular phone to the portal engine. Using image recognition techniques, the portal engine recognizes the engine in the image data, and obtains object data that includes information about the make and model of Roy's car, the engine type, and a 3-D graphic mock-up of the engine.

In a variation of this example, Roy can upload a video of the engine of his car, including audio of the engine as it is running, and diagnostic data received from the engine controller. The video and controller data can be communicated instead of or in addition to the still images. In another variation of the example, Roy can record an audio clip of the engine, such as by using his phone, and upload the sound in addition to the still images and controller data.

Frank, in turn, can take photos of his tools in his own garage, and provide the image data to the portal engine. The portal engine recognizes the tools in the images submitted by Frank, and obtains object data related to the tools, including information about each of the tools (e.g., specification, sizes, gauges, etc.), and a virtual representation of the tools that is integrated into the virtual garage.

Within the virtual garage, Frank can utilize the virtual tools and the object data obtained from Roy to simulate a repair on the virtual engine. For example, Frank may determine whether the (real-world) tools he has are the right sizes/gauges for use on the parts of the engine that need to be worked on, such as whether the wrenches he has will fit the bolts of the engine, and whether the tools will accommodate the hard-to-reach corners of the engine. Using the virtual tools, Frank may service the virtual engine as he would with the real engine to get to the suspected problem area.

In embodiments where audio (or video with accompanying audio), Frank can use this audio information to assist in diagnosing potential problems with the engine. For example, the object data for a particular engine in a database can include representations of the engine, along with corresponding audio, depicting the engine as affected by a variety of known problems typically encountered by the engine (e.g., the sources of rattling, pings, and other issues that can result in an unusually-sounding engine). In these embodiments, the portal engine can employ sound recognition techniques to match the sound provided by Roy to the proper representation of the engine recognized from the visual images.

Once the virtual engine diagnostic has been performed, and Frank has arrived at the suspected cause of the trouble, the portal engine can be used to obtain data objects about the specific parts or engine components that are at fault. The data objects can include suitable replacements, their cost at various sources, and instructions on installation. Frank can further use the virtual tools to install a virtual representation of the replacement part.

In a variation of this example, the portal engine can present an augmented reality overlay of some or all of the virtual representation of the car's engine over the real-world engine, such as via the display on Roy's phone. As such, Roy can see the changes Frank makes to the virtual engine using the virtual tools, overlaid on the real engine. If Roy has some of the same tools Frank has introduced into the virtual garage, the augmented reality function can be used as a virtual guide that walks Roy through the work he can do on the real-world engine on his own.

The following is another illustrative example of a use case involving the inventive subject matter. Consider a scavenger-hunt game played by participants that are remotely located from one another.

In this example, a clue in a scavenger hunt can require a combination of elements by players that are playing together while being physically far apart. For example, a clue in the scavenger hunt can require a piece of paper retrieved from a location close to Player A and the use of a pencil retrieved from a location close to teammate Player B, who in real life is across the country from Player A. To be able to retrieve the clue, Player A can use their camera-equipped phone to take a picture of the piece of paper at the proper location. Based on the image of the paper and GPS or other location-identifying data provided by the phone, the portal engine can recognize the paper as the correct one for the scavenger hunt, and obtain object data associated with the use of the paper in the game. Upon arriving at the appropriate location, Player B can use their camera-equipped phone to take a photo of the pencil. The image, as well as location information, is similarly provided to the portal engine, which similarly confirms the pencil as a correct pencil for the game, and obtains object data associated with the pencil. In an alternative scenario, the background content of images can be used to recognize the location of the photos of Player A and/or Player B instead of GPS or other location information.

The object data of the paper and the pencil may include virtual representations of each, which can be communicated for presentation on the display of each player's phone. The object data can also include instructions regarding the clue, such as instructing Player B to write a particular password on the virtual paper using the virtual pencil (such as via touch input using the touch-screen of Player B's phone). After the correct phrase is written, the next clue in the scavenger hunt can be presented to both players.

In another game-related example, Player A may be required to explore a dark room. To aid in this part of the game, Player A may be asked to take an image of a candle, e.g., using a mobile device, which is provided to the portal engine. The portal engine may be configured to recognize the candle, and generate a virtual representation of the candle (e.g., utilizing an image recognition algorithm) for display on the devices of Player A and Player B. Player B, may then be asked to find an object capable of producing fire, such as a set of matches or a lighter. Upon finding a lighter, Player B may take an image of the lighter using a mobile device camera and communicate the image to the portal engine. The portal engine may be configured to recognize the lighter and generate a virtual representation of the lighter that Player B is able to interact with. Player B can then use the virtual representation of the lighter to light the virtual representation of the candle. Upon lighting the candle, game functions associated with the lit candle may provide instructions to Player A's mobile device to turn on the camera's flash or to turn the display of the Player A's device white and at maximum brightness, so as to act as a source of light to search the dark room.

In a variation of this example, the darkness of the room can be a virtual darkness in addition to a real-world darkness, where the goal of exploring the dark room is to find an augmented reality item. Thus, while the real-world component of the augmented reality item might be found with any other light source, only the use of the lit virtual candle would reveal the virtual aspects of the augmented reality item.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 3 and 7 may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 8:
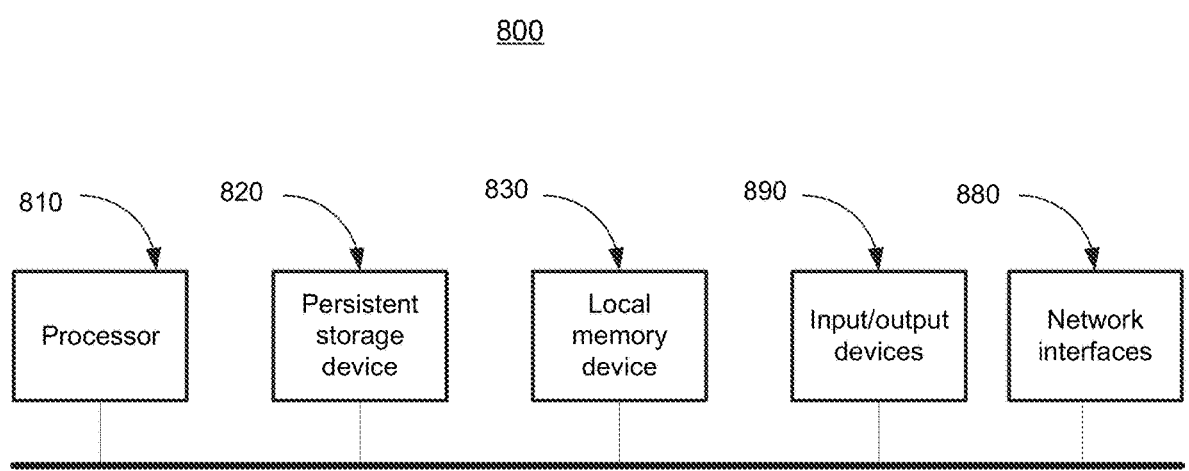
FIG. 8 illustrates a block diagram of a distributed computer system that can be used for implementing one or more aspects of the various embodiments.

A high-level block diagram of an exemplary apparatus that may be used to implement systems, apparatus and methods described herein is illustrated in FIG. 8. Apparatus 800 comprises a processor 810 operatively coupled to a persistent storage device 820 and a main memory device 830. Processor 810 controls the overall operation of apparatus 800 by executing computer program instructions that define such operations. The computer program instructions may be stored in persistent storage device 820, or other computer-readable medium, and loaded into main memory device 830 when execution of the computer program instructions is desired. For example, portal engine 110 and object database 120 may comprise one or more components of apparatus 800. Thus, the method steps of FIGS. 3 and 7 can be defined by the computer program instructions stored in main memory device 830 and/or persistent storage device 820 and controlled by processor 810 executing the computer program instructions. For example, the computer program instructions can be implemented as computer executable code programmed by one skilled in the art to perform an algorithm defined by the method steps of FIGS. 3 and 7. Accordingly, by executing the computer program instructions, the processor 810 executes an algorithm defined by the method steps of FIGS. 3 and 7. Apparatus 800 also includes one or more network interfaces 880 for communicating with other devices via a network. Apparatus 800 may also include one or more input/output devices 890 that enable user interaction with apparatus 800 (e.g., display, keyboard, mouse, speakers, buttons, etc.).

Processor 810 may include both general and special purpose microprocessors, and may be the sole processor or one of multiple processors of apparatus 800. Processor 810 may comprise one or more central processing units (CPUs), for example. Processor 810, persistent storage device 820, and/or main memory device 830 may include, be supplemented by, or incorporated in, one or more application-specific integrated circuits (ASICs) and/or one or more field programmable gate arrays (FPGAs).

Persistent storage device 820 and main memory device 830 each comprise a tangible non-transitory computer readable storage medium. Persistent storage device 820, and main memory device 830, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 890 may include peripherals, such as a printer, scanner, display screen, etc. For example, input/output devices 890 may include a display device such as a cathode ray tube (CRT), plasma or liquid crystal display (LCD) monitor for displaying information (e.g., a plurality of image transformations for selection) to a user, a keyboard, and a pointing device such as a mouse or a trackball by which the user can provide input to apparatus 800.

Any or all of the systems and apparatus discussed herein, including portal engine 110 and object database 120 may be performed by, and/or incorporated in, an apparatus such as apparatus 800.

One skilled in the art will recognize that an implementation of an actual computer or computer system may have other structures and may contain other components as well, and that FIG. 8 is a high level representation of some of the components of such a computer for illustrative purposes.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A multiparty object recognition system for interactively manipulating virtual object data, the system comprising:
   a processor;
   an object database configured to store first party object data, captured using a first device associated with a first party, that corresponds to at least one structural or property representation of a first real-world object and further configured to store second party object data, captured using a second device associated with a second party, that corresponds to at least one structural or property representation of a second real-world object; and
   a memory storing software instructions that, when executed by a processor, cause the processor to:
   obtain the first party object data and the second party object data for storage within the object database;
   control access to the object database such that the first party object data and the second party object data is accessible to at least the first party and the second party;
   generate modified first party object data by facilitating modification of the first party object data by the second party, the modified first party object data being in accordance with at least one context parameter of the second party object data, wherein the first party object data and second party object data are analyzed based on matching features of the first party object data and the second party object data;
   identify the modified first party object data as a recognized real-world object;
   retrieve, from the object database, additional object data associated with the recognized real-world object, wherein the additional object data is updatable over time to include increasingly specific recognitions of the recognized real-world object; and
   communicate the modified first party object data for presentation to the first party, wherein the communication includes at least portions of the first party object data and second party object data such that, when displayed to the first party, the presentation comprises the at least one structural or property representation of the first real-world object and the at least one structural or property representation of the second real-world object, wherein the at least one structural or property representation of the first real-world object is rendered as being manipulated or otherwise modified by the at least one structural or property representation of the second real-world object in accordance with the modified first party object data.

2. The system of claim 1, wherein the at least one context parameter corresponds to at least one of a temporal context, a spatial context, a thematic context, an additive context, a subtractive context, and a geometric context of the second party object data.

3. The system of claim 1, wherein the modified first party object data is usable for presentation within a collaborative user environment.

4. The system of claim 1, wherein the modified first party object data is communicated to the first party in real-time.

5. The system of claim 1, wherein the modified first party object data is communicated as one of machine-readable image data or raw data which is convertible at a receiving device.

6. The system of claim 1, wherein matching features of the first party object data and the second party object data includes using at least one of an image recognition algorithm, a pattern recognition algorithm, a speech recognition algorithm, a user matching algorithm, and a location recognition algorithm.

7. The system of claim 1, wherein at least one of the first party object data and the second party object data includes at least one of digital image data, digital video data, digital audio data, digital text data, known virtual object data, biometric data, financial data, medical data, and transaction data.

8. The system of claim 1, wherein at least one of the first party object data and the second party object data comprises metadata.

9. The system of claim 8, wherein the metadata comprises at least one of first party-specific data or second party-specific data, location data, time data, user identification data, annotation data, social media data, product data, security data, and contextual data.

10. The system of claim 1, wherein the processor is further caused to obtain at least one of the first party object data and the second party object data by using an image recognition algorithm on a digital representation of at least one of the first real-world object and the second real-world object.

11. The system of claim 1, wherein the processor is further caused to obtain at least one of the first party object data and the second party object data based on at least one of an identification of object data by a user, and an instruction from another device.

12. The system of claim 1, wherein the first real-world object includes at least one of a visible object, an audible object, a biometric object, a motion, and a gesture.

13. The system of claim 12, wherein the visible object comprises at least one of a living object, a landmark, an architectural structure, a conveyance, a consumer product, a tool, a printed or displayed object, a toy, a musical instrument, an educational item, an art object, or a natural inanimate object.

14. The system of claim 12, wherein the audible object comprises at least one of a voice, a sound of a musical instrument, a sound of a living object, a sound of an inanimate object, a sound of a vehicle, and an electronically generated audible signal.

15. The system of claim 1, wherein the first real-world object and second real-world object comprise different aspects of a single real-world object.

16. The system of claim 1, wherein the first real-world object comprises at least one property that triggers the modification of the first party object data, the at least one property comprising at least one of a chemical signature, temperature, pressure, electromagnetic field, radiofrequency, shape, color, texture, taste, smell, mechanical, biometric, or electrical property.

17. The system of claim 1, wherein the modification of the first party object data comprises one or more of adding supplemental information, changing a spatial aspect of the first party object data, changing an attribute of the first party object data, combining the first party object data with the second party object data, creating or changing a relationship between the first party object data and the second party object data, and adding contextual data to the first party object data.

18. The system of claim 1, wherein the modification of the first party object data includes at least one of filtering, moving, manipulating, combining, editing, annotating, or animating the first party object data.

19. The system of claim 1, wherein the modified first party object data comprises at least one of the second party object data, and object data from a source other than the first party and the second party.

20. The system of claim 1, wherein the object database is accessible to at least the first party and the second party via a user portal.

21. The system of claim 20, wherein the user portal comprises at least one of a mobile device, an appliance, a vehicle, a robot, a kiosk, a television, and a game console.

22. The system of claim 20, wherein the processor is further caused to present a user interface, comprising at least one of a graphical user interface, a voice-controlled interface, and a motion-controlled interface, for access to the object database.

23. The system of claim 1, wherein the processor is further caused to control access to the object database such that the object database is accessible to a party other than the first party and second party.

24. The system of claim 23, wherein the processor is further caused to control access to the object database based on at least one of a classification of a real-world object, a proximity metric, a subscription status, and an authorization.

25. The system of claim 1, further comprising storing the modified first party object data within the object database, wherein the modified first object data is further modifiable to generate nth-order modified first object data.

26. The system of claim 1, further comprising communicating the modified first party object data to the second party.

27. The system of claim 1, wherein the first party and the second party include at least one of a person, a group of people, and an automated device.

28. A multiparty object recognition method for interactively manipulating virtual object data, wherein an object database is configured to store first party object data, captured using a first device associated with a first party, that corresponds to at least one structural or property representation of a first real-world object and further configured to store second party object data, captured using a second device associated with a second party, that corresponds to at least one structural or property representation of a second real-world object, the method comprising:

obtaining the first party object data and the second party object data for storage within the object database;
  controlling access to the object database such that the first party object data and the second party object data is accessible to at least the first party and the second party;
  generating modified first party object data by facilitating modification of the first party object data by the second party, the modified first party object data being in accordance with at least one context parameter of the second party object data, wherein the first party object data and second party object data are analyzed based on matching features of the first party object data and the second party object data;
  identifying the modified first party object data as a recognized real-world object;

retrieving, from the object database, additional object data associated with the recognized real-world object, wherein the additional object data is updatable over time to include increasingly specific recognitions of the recognized real-world object; and communicating the modified first party object data for presentation to the first party, wherein the communication includes at least portions of the first party object data and second party object data such that, when displayed to the first party, the presentation comprises the at least one structural or property representation of the first real-world object and the at least one structural or property representation of the second real-world object, wherein the at least one structural or property representation of the first real-world object is rendered as being manipulated or otherwise modified by the at least one structural or property representation of the second real-world object in accordance with the modified first party object data.

29. A computer program product embedded in a non-transitory computer readable medium comprising instructions executable by a computer processor for interactively manipulating virtual object data, wherein an object database is configured to store first party object data, captured using a first device associated with a first party, that corresponds to at least one structural or property representation of a first real-world object and further configured to store second party object data, captured using a second device associated with a second party, that corresponds to at least one structural or property representation of a second real-world object, the instructions being executable by a computer processor to execute processing comprising:

obtaining the first party object data and the second party object data for storage within the object database;

controlling access to the object database such that the first party object data and the second party object data is accessible to at least the first party and the second party;

generating modified first party object data by facilitating modification of the first party object data by the second party, the modified first party object data being in accordance with at least one context parameter of the second party object data, wherein the first party object data and second party object data are analyzed based on matching features of the first party object data and the second party object data;

identifying the modified first party object data as a recognized real-world object;

retrieving, from the object database, additional object data associated with the recognized real-world object, wherein the additional object data is updatable over time to include increasingly specific recognitions of the recognized real-world object; and communicating the modified first party object data for presentation to the first party, wherein the communication includes at least portions of the first party object data and second party object data such that, when displayed to the first party, the presentation comprises the at least one structural or property representation of the first real-world object and the at least one structural or property representation of the second real-world object, wherein the at least one structural or property representation of the first real-world object is rendered as being manipulated or otherwise modified by the at least one structural or property representation of the second real-world object in accordance with the modified first party object data.

\* \* \* \* \*